(12) United States Patent
Wang et al.

(10) Patent No.: US 11,366,209 B2
(45) Date of Patent: **\*Jun. 21, 2022**

(54) METHOD FOR DETERMINING CHANGE IN DISTANCE, LOCATION PROMPTING METHOD AND APPARATUS AND SYSTEM THEREOF

(71) Applicant: ADVANCED NEW TECHNOLOGIES CO., LTD., Grand Cayman (KY)

(72) Inventors: Nan Wang, Hangzhou (CN); Qiang He, Hangzhou (CN); Zhijun Du, Hangzhou (CN)

(73) Assignee: ADVANCED NEW TECHNOLOGIES CO., LTD., George Town (KY)

( \* ) Notice: Subject to any disclaimer, the term of this patent is extended or adjusted under 35 U.S.C. 154(b) by 0 days.

This patent is subject to a terminal disclaimer.

(21) Appl. No.: 17/344,476

(22) Filed: Jun. 10, 2021

(65) Prior Publication Data

US 2021/0302556 A1 Sep. 30, 2021

Related U.S. Application Data

(63) Continuation of application No. 16/274,450, filed on Feb. 13, 2019, now Pat. No. 11,047,966, which is a
(Continued)

(30) Foreign Application Priority Data

Aug. 17, 2016 (CN) .......................... 201610682482.2

(51) Int. Cl.
*G01S 11/14* (2006.01)
*G01S 3/808* (2006.01)
(Continued)

(52) U.S. Cl.
CPC .............. *G01S 11/14* (2013.01); *G01S 3/8083* (2013.01); *G01S 5/22* (2013.01); *G01S 5/30* (2013.01); *G01S 15/34* (2013.01)

(58) Field of Classification Search
CPC .......... G01S 11/14; G01S 15/34; G01S 3/808; G01S 5/22; G01S 5/30; G01S 3/8083
See application file for complete search history.

(56) References Cited

U.S. PATENT DOCUMENTS 2,415,095 A \* 2/1947 Varian ....................... G01S 1/02
342/109
4,333,170 A 6/1982 Mathews et al.
(Continued)

FOREIGN PATENT DOCUMENTS

CA 2258278 C 3/2009
CN 1651930 A 8/2005
(Continued)

OTHER PUBLICATIONS

Written Opinion of the International Searching Authority and International Search Report for PCT Application No. PCT/CN2017/095920 dated Oct. 24, 2017 (15 pages).
(Continued)

*Primary Examiner* — Isam A Alsomiri
*Assistant Examiner* — Amie M Ndure

(57) ABSTRACT

A method for determining a change in a distance, a location prompting method and an apparatus and a system thereof are provided. The method includes: sending, by a receiving terminal, a paring request to a server for the server to forward the paring request to a transmitting terminal, and to allocate a frequency band for the receiving terminal and the transmitting terminal after the transmitting terminal accepts the paring request; acquiring, by the receiving terminal, an acoustic wave signal of a frequency sent by the transmitting terminal, wherein the frequency is determined by the trans-
(Continued)

mitting terminal based on the allocated frequency band; determining, by the receiving terminal, a change in the acquired acoustic wave signal; and determining, by the receiving terminal, a change in a distance between the transmitting terminal and the receiving terminal according to the change in the acquired acoustic wave signal.

20 Claims, 11 Drawing Sheets

Related U.S. Application Data continuation of application No. PCT/CN2017/095920, filed on Aug. 4, 2017.

(51) Int. Cl.
  *G01S 5/22*    (2006.01)
  *G01S 5/30*    (2006.01)
  *G01S 15/34*    (2006.01)

(56) References Cited

U.S. PATENT DOCUMENTS

| | | | |
|---|---|---|---|
| 5,343,863 | A | 9/1994 | Wiener et al. |
| 5,627,800 | A | 5/1997 | Kotler et al. |
| RE35,607 | E | 9/1997 | Nagamune et al. |
| 5,742,379 | A | 4/1998 | Reifer |
| 5,889,490 | A | 3/1999 | Wachter et al. |
| 5,959,568 | A | 9/1999 | Woolley |
| 6,266,623 | B1 | 7/2001 | Vock et al. |
| 6,298,008 | B1 | 10/2001 | Lyon et al. |
| 6,553,013 | B1 | 4/2003 | Jones et al. |
| 6,642,702 | B1 | 11/2003 | Matuyama |
| 6,710,719 | B1 | 3/2004 | Jones et al. |
| 6,946,949 | B2 | 9/2005 | Heide et al. |
| 7,202,941 | B2 | 4/2007 | Munro |
| 7,750,841 | B2 | 7/2010 | Oswald et al. |
| 7,787,886 | B2 | 8/2010 | Markhovsky et al. |
| 7,822,424 | B2 | 10/2010 | Markhovsky et al. |
| 7,936,271 | B2 | 5/2011 | Karr et al. |
| 8,693,286 | B1 | 4/2014 | Rogers et al. |
| 9,400,903 | B2 | 7/2016 | Wang et al. |
| 9,820,146 | B2 | 11/2017 | Gross et al. |
| 2004/0024313 | A1 | 2/2004 | Moriya et al. |
| 2004/0032363 | A1 | 2/2004 | Schantz et al. |
| 2005/0285773 | A1* | 12/2005 | Hartzstein ............. G01S 13/345 342/70 |
| 2008/0033647 | A1 | 2/2008 | Milark et al. |
| 2008/0201490 | A1* | 8/2008 | Quackenbush ..... H04L 12/4625 709/247 |
| 2008/0231498 | A1 | 9/2008 | Menzer et al. |
| 2008/0262849 | A1 | 10/2008 | Buck et al. |
| 2010/0226210 | A1 | 9/2010 | Kordis et al. |
| 2010/0265083 | A1 | 10/2010 | Hou et al. |
| 2010/0277305 | A1* | 11/2010 | Garner ................. A61B 8/4438 340/539.1 |
| 2010/0312901 | A1 | 12/2010 | Noyranen et al. |
| 2011/0187578 | A1* | 8/2011 | Farneth ................... G01S 13/32 342/27 |
| 2012/0158238 | A1 | 6/2012 | Daley et al. |
| 2013/0235366 | A1 | 9/2013 | Giacotto et al. |
| 2013/0275077 | A1 | 10/2013 | Kim et al. |
| 2014/0094180 | A1* | 4/2014 | Zhou ..................... H04W 76/14 455/445 |
| 2014/0156319 | A1 | 6/2014 | Deeb |
| 2015/0043007 | A1 | 2/2015 | Kwiatkowski et al. |
| 2015/0117160 | A1 | 4/2015 | Sakurada |
| 2015/0331095 | A1 | 11/2015 | Sato et al. |
| 2015/0373615 | A1 | 12/2015 | Hampel |
| 2016/0014805 | A1 | 1/2016 | Merlin et al. |
| 2016/0061931 | A1 | 3/2016 | Sakamoto et al. |
| 2017/0318463 | A1 | 11/2017 | Lee et al. |
| 2018/0252796 | A1 | 9/2018 | Qu et al. |
| 2019/0044599 | A1* | 2/2019 | Kakishima ............ H04L 5/0048 |

FOREIGN PATENT DOCUMENTS

| | | |
|---|---|---|
| CN | 1993631 A | 7/2007 |
| CN | 101918753 A | 12/2010 |
| CN | 202019454 U | 10/2011 |
| CN | 104160294 A | 11/2014 |
| CN | 104569956 A | 4/2015 |
| CN | 104885135 A | 9/2015 |
| CN | 105372646 A | 3/2016 |
| CN | 105530016 A | 4/2016 |
| CN | 105738972 A | 7/2016 |
| CN | 105792355 A | 7/2016 |
| DE | 60316818 T2 | 2/2008 |
| EP | 0958504 B1 | 5/2006 |
| EP | 2637038 A1 | 9/2013 |
| EP | 1815267 B1 | 6/2015 |
| TW | 201531979 A | 8/2015 |

OTHER PUBLICATIONS

International Preliminary Report on Patentability Chapter I for PCT Application No. PCT/CN2017/095920 dated Feb. 28, 2019 (11 pages).
Non-final rejection and Search Report for Taiwanese Application No. 106119673 dated Oct. 1, 2018 (11 pages).
First Office Action for Chinese Patent Application No. 201610682482.2 dated Dec. 12, 2018 (11 pages).
First Search for Chinese Patent Application No. 201610682482.2 dated Nov. 19, 2018 (1 page).
Second Office Action for Chinese Patent Application No. 201610682482.2 dated May 23, 2019 with English machine translation (23 pages).

* cited by examiner

METHOD FOR DETERMINING CHANGE IN DISTANCE, LOCATION PROMPTING METHOD AND APPARATUS AND SYSTEM THEREOF

CROSS-REFERENCE TO RELATED APPLICATIONS

This present application is a continuation application of U.S. patent application Ser. No. 16/274,450 filed Feb. 13, 2019, which is a continuation application of International Patent Application No. PCT/CN2017/095920, filed on Aug. 4, 2017, which is based on and claims priority to Chinese Patent Application No. 201610682482.2, entitled "METHOD FOR DETERMINING CHANGE IN DISTANCE, LOCATION PROMPTING METHOD AND APPARATUS AND SYSTEM THEREOF" and filed on Aug. 17, 2016. The above-referenced applications are incorporated herein by reference in their entirety.

TECHNICAL FIELD

This application relates to the field of positioning technologies, and in particular, to a method for determining a change in a distance, a location prompting method and an apparatus and a system thereof.

BACKGROUND

With the development of science and technologies, positioning technologies are widely applied to lives of users. For example, users often install a location tracker in a vehicle. When a vehicle is stolen, the user may learn a location of the vehicle according to the location tracker, thereby facilitating a search.

Currently, frequently-used positioning manners include GPS (global positioning system) positioning and LBS (location based service) positioning. A target is mainly located by means of the GPS positioning by using a satellite navigation system. The LBS positioning is mainly used for users of mobile phones, and a user of a mobile terminal is located through a wireless communications network (for example, a GSM network or a CDMA network) of a telecommunications operator or a mobile operator, or with the help of the GPS positioning, or the like.

Generally, an error of location information of a target user obtained by means of the GPS positioning is approximately 4 meters to 5 meters. When the LBS positioning is used, with the help of the GPS positioning, an error of obtained location information of the target user is also approximately 4 meters to 5 meters. If the user uses a wireless communications network of a telecommunications operator or a mobile operator (a base station) instead of enabling a GPS function, an error of obtained location information of the target user is approximately 100 meters. Therefore, when a distance between two located users is relatively small, a change in the distance between the two located users cannot be accurately obtained by using an existing positioning technology. For example, for two users at different floors in a same building, location information of the two users that is obtained by using the GPS positioning or the LBS positioning may be the same. Apparently, relative position information between the two users cannot be obtained by using the existing positioning technology, and even the two users cannot find each other sometimes.

SUMMARY

In view of the foregoing problem, embodiments of this application provide a method for determining a change in a distance, a location prompting method and an apparatus and a system thereof, to resolve the problem that when a distance between two located users is relatively small, a change in a distance between the two users cannot be determined by using an existing positioning technology.

The present application provides a method for determining a change in a distance, including:

sending, by a receiving terminal, a paring request to a server for the server to forward the paring request to a transmitting terminal, and to allocate a frequency band for the receiving terminal and the transmitting terminal after the transmitting terminal accepts the paring request;

acquiring, by the receiving terminal, an acoustic wave signal of a frequency sent by the transmitting terminal, wherein the frequency is determined by the transmitting terminal based on the allocated frequency band;

determining, by the receiving terminal, a change in the acquired acoustic wave signal; and determining, by the receiving terminal, a change in a distance between the transmitting terminal and the receiving terminal according to the change in the acquired acoustic wave signal.

In some embodiments, the determining a change in the acquired acoustic wave signal includes:

determining a change in energy of the acquired acoustic wave signal; and the determining the change in the distance between the transmitting terminal and the receiving terminal according to the change in the acquired acoustic wave signal includes: determining the change in the distance between the transmitting terminal and the receiving terminal according to the change in the energy of the acquired acoustic wave signal.

In some embodiments, the acoustic wave signal of the frequency is selected by the transmitting terminal from acoustic waves corresponding to the frequency band.

In other embodiments, the frequency band is allocated to the receiving terminal and the transmitting terminal when the server determines that the distance between the receiving terminal and the transmitting terminal is within the preset distance range.

In still other embodiments, another one or more frequency bands are allocated to the receiving terminal and the transmitting terminal by the server and the acoustic wave signal of the frequency sent by the transmitting terminal comprises acoustic waves of frequencies respectively corresponding to the two or more frequency bands that are superimposed together.

In some embodiments, after the determining a change in a distance between the transmitting terminal and the receiving terminal, the method further includes: generating prompt information according to the change in the distance for prompting the change in the distance between the receiving terminal and the transmitting terminal.

In other embodiments, after the generating prompt information according to the change in the distance, the method further includes:

sending, by the receiving terminal, the prompt information to the transmitting terminal, to prompt the change in the distance between the receiving terminal and the transmitting terminal.

In still other embodiments, after the generating prompt information according to the change in the distance, the method further includes:

sending, by the receiving terminal, through the server, the prompt information to the transmitting terminal, to prompt the change in the distance between the receiving terminal and the transmitting terminal.

In yet other embodiments, a manner of prompting the change in the distance between the receiving terminal and the transmitting terminal includes at least one of the following:

prompting the change in the distance between the receiving terminal and the transmitting terminal with a sound;

prompting the change in the distance between the receiving terminal and the transmitting terminal with a picture;

prompting the change in the distance between the receiving terminal and the transmitting terminal with an animation; and prompting the change in the distance between the receiving terminal and the transmitting terminal with a vibration.

In some embodiments, when the prompt information prompts the change in the distance between the receiving terminal and the transmitting terminal with a sound, before the generating prompt information according to the change in the distance, the method further includes:

establishing a correspondence between a magnitude of energy of an acoustic wave signal and a volume of the sound of the prompt information.

The present application further provides a method for determining a change in a distance, including:

receiving, by a transmitting terminal, a paring request sent by a receiving terminal through a server;

accepting, by the transmitting terminal, the paring request;

receiving, by the transmitting terminal, a frequency band allocated by the server;

determining, by the transmitting terminal, an acoustic wave signal of a frequency based on the frequency band allocated by the server;

sending, by the transmitting terminal, the acoustic wave signal of the frequency to the receiving terminal;

receiving, by the transmitting terminal, information of the acoustic wave signal returned by the receiving terminal after acquiring the acoustic wave signal;

determining, by the transmitting terminal, a change in the acoustic wave signal according to the information of the acoustic wave signal; and determining, by the transmitting terminal, a change in a distance between the receiving terminal and the transmitting terminal according to the change in the acoustic wave signal.

In some embodiments, the determining a change in the acoustic wave signal according to the information of the acoustic wave signal includes:

determining a change in energy of the acoustic wave signal according to the information of the acoustic wave signal; and the determining the change in the distance between the receiving terminal and the transmitting terminal according to the change in the acoustic wave signal includes:

determining the change in the distance between the transmitting terminal and the receiving terminal according to the change in the energy of the acoustic wave signal.

In other embodiments, the receiving, by the transmitting terminal, information of the acoustic wave signal returned by the receiving terminal includes: receiving, by the transmitting terminal, the information on the energy of the acoustic wave signal via the server.

This application further provides an apparatus for determining a change in a distance. The apparatus is located in a receiving terminal, comprising: one or more processors and one or more non-transitory computer-readable memories coupled to the one or more processors and configured with instructions executable by the one or more processors to cause the apparatus to perform operations comprising:

sending a paring request to a server for the server to forward the paring request to a transmitting terminal, and to allocate a frequency band for the receiving terminal and the transmitting terminal after the transmitting terminal accepts the paring request;

acquiring the acoustic wave signal of the frequency sent by the transmitting terminal, wherein a frequency is determined by the transmitting terminal based on the allocated frequency band;

determining a change in the acquired acoustic wave signal; and determining a change in a distance between the transmitting terminal and the receiving terminal according to the change in the acquired acoustic wave signal.

The method provided in this application mainly depends on sending and receiving of the acoustic wave signal between the transmitting terminal and the receiving terminal. The change in the distance between the transmitting terminal and the receiving terminal is determined according to the received acoustic wave signal. Compared with positioning methods in the existing technologies, according to the method for determining a change in a distance provided in this application, when the distance between locations of the transmitting terminal and the receiving terminal is relatively small, a change in a distance between the two terminals also can be determined. In this application, corresponding prompt information may further be generated according to the change in the distance between the two terminals. The prompt information is used to prompt a user about the change in the distance between the two terminals, and guide the user to move in a direction in which a distance between the two terminals is reduced. Compared with the existing positioning technologies, when a distance between two located users is relatively small, a chance of the users finding each other is increased by using the method provided in this application.

BRIEF DESCRIPTION OF THE DRAWINGS

The accompanying drawings herein are provided for further understanding of this application, and constitute a part of this application. Embodiments and explanations thereof in this application are used to explain this application, but do not constitute an unsuitable limitation to this application. In the accompanying drawings.

DETAILED DESCRIPTION OF THE APPLICATION

Figure 1:
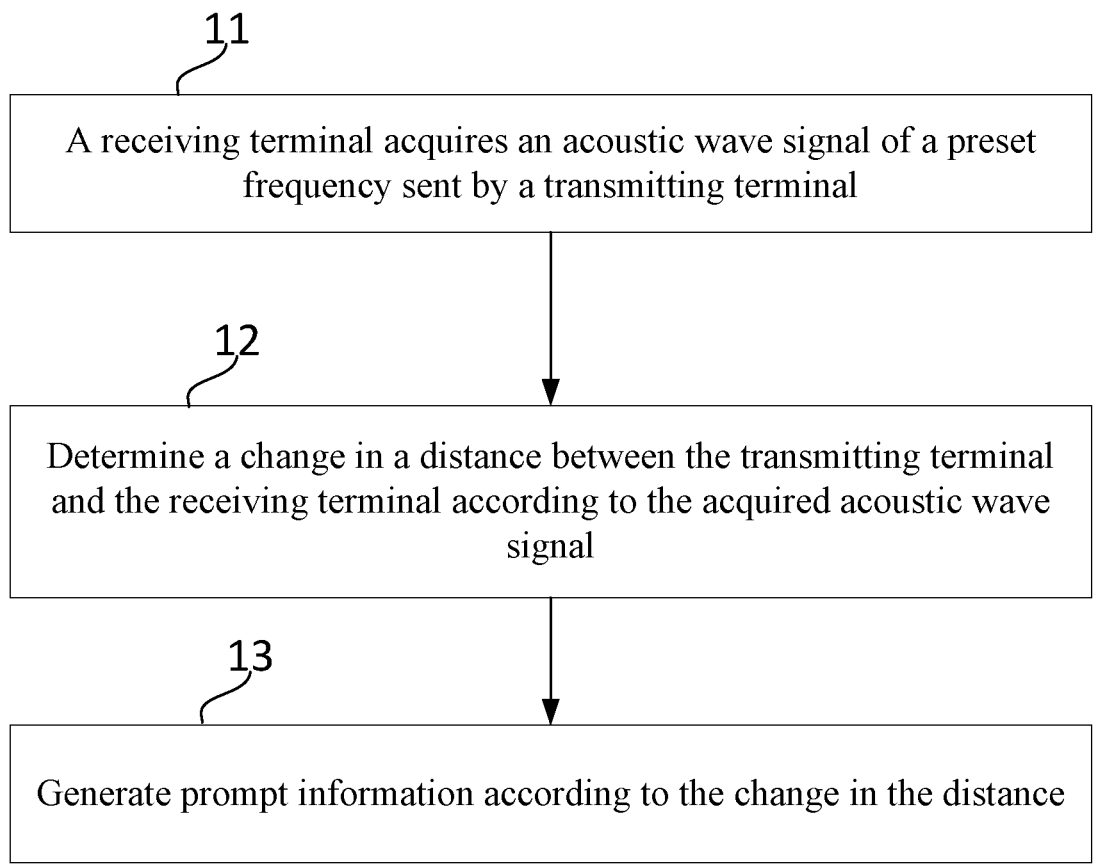
FIG. 1 is a schematic flowchart of a method for determining a change in a distance according to an embodiment of this application.

It has been mentioned in the background that currently, frequently-used positioning manners include GPS positioning and LBS positioning. For the GPS positioning, an error is usually 4 meters to 5 meters. Many reasons result in the error. For example, an error of a satellite ephemeris results in an error of obtained location information of a target. When the target is located by using a GPS positioning technology, location information of several satellites participating in the GPS positioning needs to be calculated. Thus, orbit parameters corresponding to the GPS satellites at a time need to be learned, and the parameters are provided by ephemerides of various types. However, whichever type of ephemeris of a satellite is used to calculate the location information of the satellites, the calculated location information is different from actual location information of the satellites. As a result, an error also occurs to the location information of the target obtained by means of GPS positioning. For another example, an error also exists between a time on a satellite and a standard time. The time on the satellite is usually faster than the time on the Earth. Accordingly, obtained location information of a target has an error. A signal transmission path may also results in an error. Because a transmission medium is not even in a process in which a signal is transmitted from a satellite to the Earth, or even a type of the medium may also vary, a transmission speed of the signal is not fixed. However, during calculation of location information of a target, this problem is usually ignored, and by default, the transmission speed is the same. Even if this problem is considered, an error caused by this problem is only avoided as much as possible, but the error cannot be eliminated completely. Certainly, factors also result in an error during the GPS positioning. This is not described herein.

For the LBS positioning, generally, the GPS positioning is preferably used to measure location information of a target, and then the target is located according to the location information. Therefore, an error of the measured location information of the target is also 4 meters to 5 meters. However, if a wireless communications network of a telecommunications operator or a mobile operator (base station) is used without the help of the GPS positioning, an error of obtained location information of the target is approximately 100 meters. For the LBS positioning, there are also many reasons resulting in an error. For example, a base station density and signal interference both affect precision of the LBS positioning.

As may be learned above, when the two located users are quite far from each other, the users may learn location information of each other by using a current GPS positioning or LBS positioning technology. However, when a distance between the two located users is relatively small, due to a measurement error of the GPS positioning or the LBS, the two located users cannot learn relative location information of each other sometimes. In addition, regardless of the GPS positioning or the LBS positioning, location information of a target that is usually measured is location information under a latitude and longitude coordinate system. Therefore, if the two located users are located on different floors in a same building and the two floors are located on the same latitude, then location information of the two users that is obtained by using an existing positioning technology may be the same. Apparently, the two users cannot find each other by using the existing positioning technology.

In view of the foregoing problem, this application provides a method for determining a change in a distance, a location prompting method and an apparatus and a system thereof. To make the objectives, technical solutions, and advantages of this application clearer, the following describes the technical solutions of this application in detail with reference to embodiments of this application and the corresponding accompanying drawings. Apparently, the described embodiments are merely some rather than all of the embodiments of this application. All other embodiments obtained by a person of ordinary skill in the art based on the embodiments of this application without creative efforts shall fall within the protection scope of this application.

The following describes the technical solution provided in each embodiment of this application in detail with reference to the accompanying drawings.

Embodiment 1

This embodiment of this application provides a method for determining a change in a distance, to resolve a problem that when a distance between two located users is relatively small, a change in the distance between the two users cannot be determined by using an existing positioning technology. A schematic flowchart of the method is shown in FIG. 1, and the method includes the following steps.

Step 11: A receiving terminal acquires an acoustic wave signal of a preset frequency sent by a transmitting terminal.

In this step, a frequency of the acoustic wave signal sent by the transmitting terminal is the preset frequency. The frequency may be a frequency allocated by a system to the transmitting terminal and the receiving terminal when the transmitting terminal receives a request for sending the acoustic wave signal, where the request includes information of the receiving terminal. Alternatively, the frequency may be a frequency specified by the transmitting terminal and the receiving terminal in advance after a pairing relationship is established. For a service of a same transmitting terminal and receiving terminal, after a frequency of acoustic wave signals is determined, before the service is completed, the transmitting terminal sends only acoustic wave signals satisfying the preset frequency, and the receiving terminal acquires only acoustic wave signals satisfying the preset frequency, or the receiving terminal only analyzes acoustic wave signals satisfying the preset frequency in acquired acoustic wave signals.

The request for sending the acoustic wave signal sent by the transmitting terminal may be triggered by a user of the transmitting terminal on the transmitting terminal; or may be triggered by the transmitting terminal receiving an instruction from the receiving terminal. In some embodiments, on the receiving terminal, a corresponding instruction is sent to the transmitting terminal after a user of the receiving terminal performs triggering. That the receiving terminal may trigger the instruction has been authorized by the transmitting terminal, and the receiving terminal acquires the acoustic wave signal of the preset frequency sent by the transmitting terminal. In an implementation, before the receiving terminal acquires the acoustic wave signal of the preset frequency sent by the transmitting terminal, a pairing relationship may be established between the receiving terminal (a client) and the transmitting terminal (a client).

After the pairing relationship is established between the transmitting terminal and the receiving terminal, a server may allocate a frequency band of acoustic waves to the two paired clients. After the server allocates the frequency band of the acoustic waves to the two clients, the transmitting terminal sends the acoustic wave signal of the preset frequency to the receiving terminal.

The transmitting terminal herein may send the acoustic wave signal to the receiving terminal at a fixed period, for example, sending the acoustic wave signal to the receiving terminal once per minute, or sending the acoustic wave signal once per five seconds, etc. Alternatively, the transmitting terminal may not send the acoustic wave signal to the receiving terminal at a fixed period, for example, sending the acoustic wave signal only for ten times or five times within one minute. A manner in which the transmitting terminal sends the acoustic wave signal is not limited herein.

Step 12: Determine a change in a distance between the transmitting terminal and the receiving terminal according to the acquired acoustic wave signal.

In this step, a method for determining the change in the distance between the transmitting terminal and the receiving terminal by the receiving terminal according to the acquired acoustic wave signals may be: first, the receiving terminal determining a change in the acoustic wave according to the acquired acoustic wave signal, and then determining the change in the distance between the transmitting terminal and the receiving terminal according to the change in the acoustic wave.

The change in the acoustic wave may be a change in frequency, wave length, amplitude, or energy of the acoustic wave, or the like, acquired at two consecutive times, where the change is determined by the receiving terminal according to the received acoustic wave signal that is sent by the transmitting terminal.

To clearly describe this application, an example of determining "a change in energy of the acoustic wave" is used below to describe this embodiment of this application, merely provides example description, and does not constitute a limitation to this application.

Figure 2:
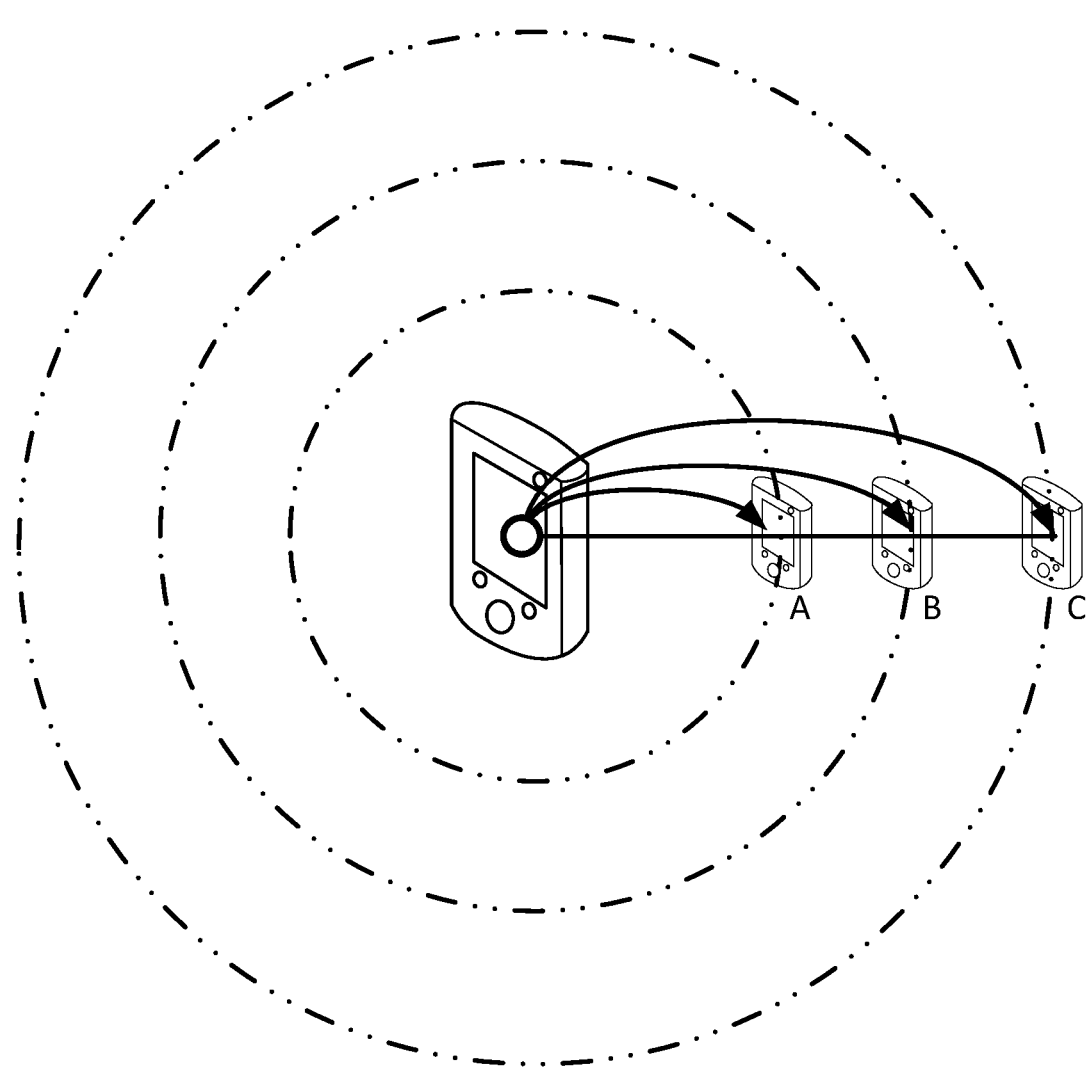
FIG. 2 is a schematic diagram of transmission of an acoustic wave signal between a receiving terminal and a transmitting terminal according to an embodiment of this application.

After acquiring the acoustic wave signal, the receiving terminal determines the change in the distance between the transmitting terminal and the receiving terminal according to a change in energy of an acoustic wave corresponding to the received acoustic wave signal. An application principle herein is: when a wave source emits an acoustic wave, the acoustic wave transmits in all directions, and usually transmits in a spherical form. As shown in FIG. 2, the transmitting terminal is used as a wave source "O" and sends an acoustic wave signal to the receiving terminal. The acoustic wave signal transmits from near to far in all directions in a spherical form. It is assumed that in an ideal situation, even if there is no energy loss, energy of the acoustic wave is constant when the acoustic wave transmits to a point A, a point B, and a point C. However, a radius of a transmitted sphere becomes increasingly large. Therefore, the area of the corresponding transmitted sphere becomes increasingly large. Accordingly, energy distributed on per unit of area becomes increasingly small. That is, a distance between the transmitting terminal and the receiving terminal becomes increasingly large, and energy of the acoustic wave received by the receiving terminal becomes increasingly small. As shown in FIG. 2, when the receiving terminal is located at the point A, point B, and point C in sequence, energy of the received acoustic wave signal becomes increasingly small.

In addition, the acoustic wave does not usually transmit in the ideal situation, that is, energy loss exists. For example, when the acoustic wave encounters an obstacle, the acoustic wave transmits in the obstacle instead of circumventing the obstacle sometimes. Therefore, the acoustic wave is used as a vibrating mechanical wave and has friction with molecules in the obstacle, converting a part of energy of the acoustic wave into thermal energy. For another example, substances such as solid particles and suspended particles usually exist in air. These substances and the acoustic wave interact between each other, consuming a part of the energy of the acoustic wave. In addition, when the distance between the receiving terminal and the transmitting terminal is larger, energy loss is more serious. Therefore, when the distance between the two clients is smaller, energy corresponding to the acoustic wave received by the receiving terminal is larger. Otherwise, energy corresponding to the acoustic wave received by the receiving terminal is smaller.

The receiving terminal determines the change in the distance between the transmitting terminal and the receiving terminal according to a change in energy of acoustic waves corresponding to an acoustic wave signal acquired consecutively. A process may be: the receiving terminal compares energy corresponding to the acoustic wave signal sent by transmitting terminal that is acquired at two consecutive times; and if the energy of the acoustic wave signal acquired at the latter of the two times is greater than the energy of the acoustic wave signal acquired at the former of the two times, according to the foregoing transmission principle of the acoustic wave, it may be learned that the distance between the receiving terminal and the transmitting terminal is reduced. Thus, it indicates that the path along which the receiving terminal and the transmitting terminal find each other is correct.

If the energy of the acoustic wave signal acquired at the latter of the two times is less than the energy of the acoustic wave signal acquired at the former of the two times, it may be determined that the distance between the receiving terminal and the receiving terminal is increased, which indicates that for the path along which the receiving terminal and the transmitting terminal find each other is incorrect.

Step 13: Generate prompt information according to the change in the distance, where the prompt information is used to prompt the change in the distance between the receiving terminal and the transmitting terminal.

In this embodiment of this application, after determining the change in the distance between the transmitting terminal and the receiving terminal according to the change in received acoustic wave, the receiving terminal may further generate the corresponding prompt information according to the change in the distance. The prompt information is used to prompt a user about the change in the distance between the transmitting terminal and the receiving terminal. For example, when determining a distance from the transmitting terminal is reduced, the receiving terminal generates prompt information. The prompt information prompts that a location at which the user is current located is closer to a location of a target user.

The prompt information is presented in many forms. For example, the prompt information may prompt the user about the change in the distance between the receiving terminal and the transmitting terminal in a form such as sound, text, animation, vibration, or a combination thereof. For example, the prompt information may be presented by using voice and vibration or using voice and animation.

If the prompt information prompts the user about the change in the distance between the transmitting terminal and the receiving terminal in a sound manner, before the prompt information is generated, a correspondence may further be established between a magnitude of energy of an acoustic wave corresponding to an acoustic wave signal and a volume of a prompt sound. For example, a larger distance between the receiving terminal and the transmitting terminal indicates a higher volume of the prompt sound, to prompt the user about an incorrect direction in which a target is searched for. Accordingly, the user may adjust the direction according to the prompt information in a timely manner.

There are many methods for establishing a correspondence between a magnitude of energy of an acoustic wave corresponding to an acoustic wave signal and a volume of a prompt sound, and may be a larger distance between the two clients indicating a higher volume of the prompt sound in the foregoing example, or may be a smaller distance between the two clients indicating a higher volume of the prompt sound, or the like. This is not limited herein.

A user holding the receiving terminal searches for a location of the transmitting terminal according to the generated prompt information. For example, in a process of searching for the transmitting terminal by the user, when the prompt information of the receiving terminal prompts that a distance between the user and the transmitting terminal is decreasing, the user can continue searching for the transmitting terminal according to a current search direction, thereby increasing search efficiency.

To describe this embodiment of this application more clearly, the following describes the foregoing steps in detail.

Figure 3:
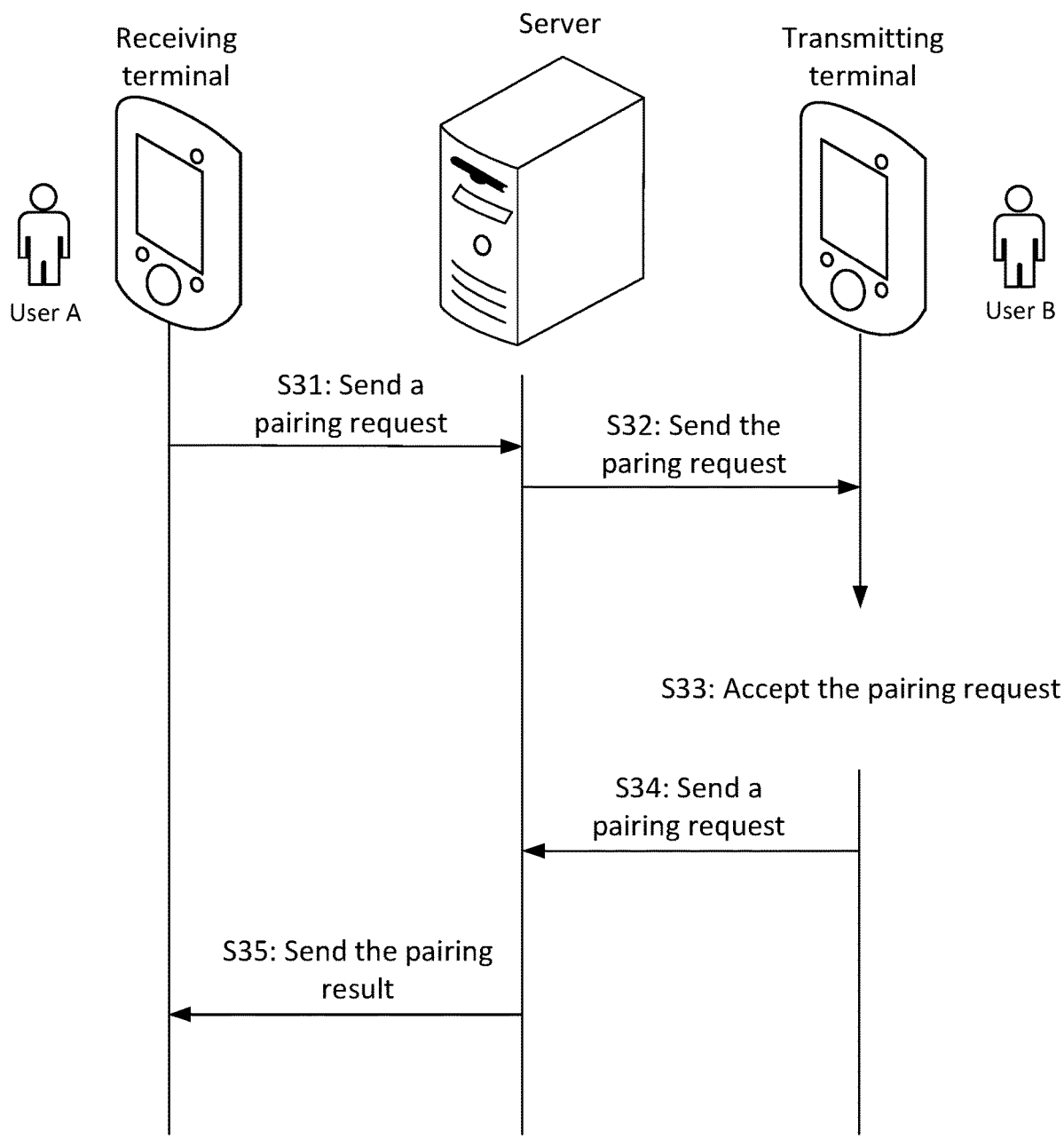
FIG. 3 is a schematic flowchart of a method for pairing of a client according to an embodiment of this application.

In step 11, there are many manners in which a pairing relationship is established between the receiving terminal and the transmitting terminal. The following describes an example of implementation:

As shown in FIG. 3, if the receiving terminal intends to establish a pairing relationship with the transmitting terminal, steps for pairing are as follows:

Step 31: A user A sends a request for pairing with the transmitting terminal to a server by using the receiving terminal.

Step 32: After receiving the request, the server sends the request to a user B holding the transmitting terminal.

Step 33: After the user B accepts the request, the receiving terminal is successfully paired with the transmitting terminal.

Figure 4:
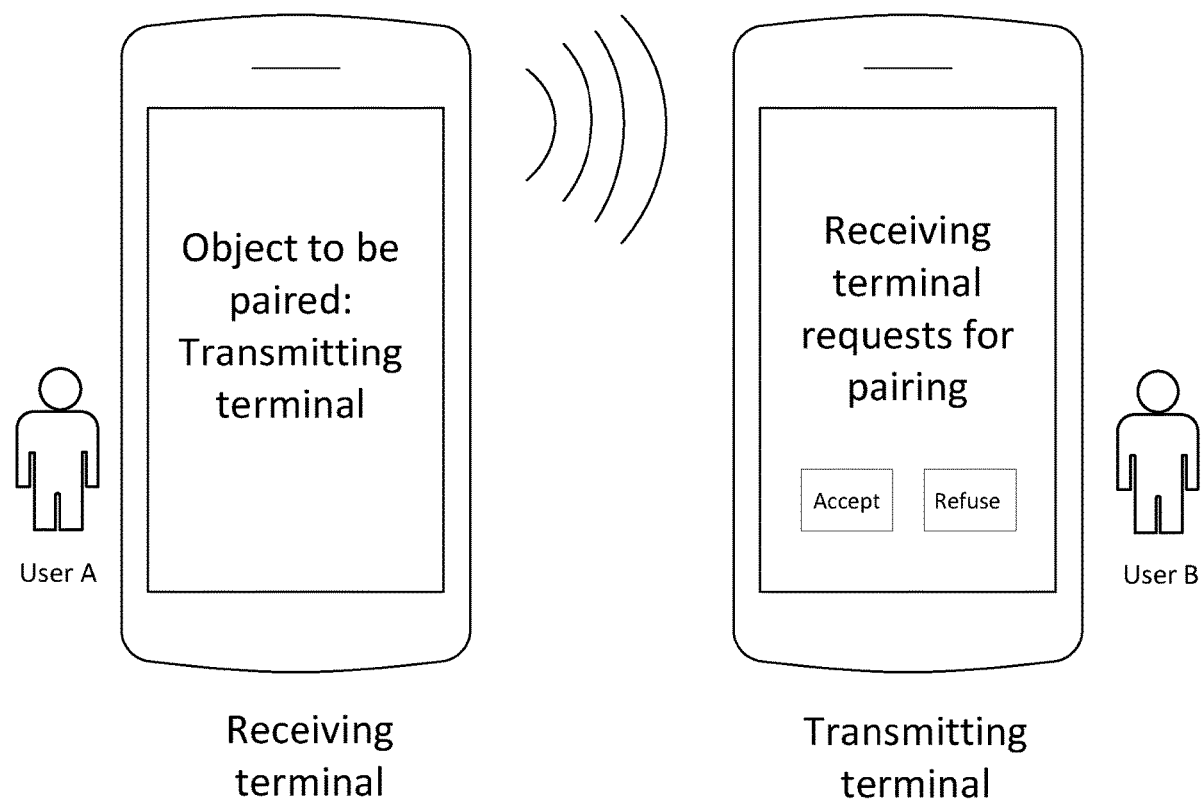
FIG. 4 is a schematic diagram of a method for pairing of a client according to an embodiment of this application.

FIG. 4 is a schematic diagram of pairing of the receiving terminal with the transmitting terminal. When the user A sends the request for pairing with the transmitting terminal to the server by using the receiving terminal, the transmitting terminal held by the user B displays: accept or refuse the pairing request of the receiving terminal. After the user B selects to accept the pairing request, the pairing relationship is successfully established between the receiving terminal and the transmitting terminal.

After the receiving terminal is successfully paired with the transmitting terminal, the transmitting terminal may further send a pairing result to the server (step 34). In this way, when the server learns that the receiving terminal is successfully paired with the transmitting terminal, the server allocates a frequency band of acoustic waves to the two clients.

After receiving the pairing result sent by the transmitting terminal, the server may further feedback the pairing result to the receiving terminal (step 35).

There are also many methods for sending the pairing request by the client to the server. For example, the client and the server both have a unique identifier of each other. In a process of sending the pairing request to the server, the identifiers of objects to be paired are also sent to the server. The server establishes, according to the pairing request, a pairing relationship between two parties requiring pairing. The unique identifier herein may be a login account of software, or may be identifiers of devices used by the two parties to be paired, or the like.

After the pairing relationship is established between the receiving terminal and the transmitting terminal, the server allocates a frequency band of acoustic waves to the receiving terminal and the transmitting terminal. The server allocates the frequency band of acoustic waves to the two clients instead of a fixed frequency. A reason is that: in a transmission process of the acoustic wave, the frequency is not constant, and is affected by many factors. For example, the acoustic wave is affected by a transmission medium, weather, an obstacle, and the like. Therefore, after the receiving terminal emits an acoustic wave of a fixed frequency, a frequency of the acoustic wave received by the transmitting terminal usually changes. Therefore, the server herein allocates the frequency band of acoustic waves to the two clients. For example, the frequency band of acoustic waves allocated by the server ranges from 20000 HZ to 20005 HZ.

To prevent the two clients from generating noise in a process of sending the acoustic wave, the frequency band of acoustic waves allocated by the server in this step may be a frequency band inaudible to human ears. A frequency of acoustic waves audible to human ears usually ranges from 20 HZ to 20000 HZ. An acoustic wave of a frequency less than 20 HZ or greater than 20000 HZ is inaudible to human ears. Therefore, a frequency band less than 20 HZ or a frequency band greater than 20000 HZ may be selected. However, when the transmitting terminal selects to send an acoustic wave of a relatively small frequency, the receiving terminal may not receive the acoustic wave. Even if the receiving terminal receives the acoustic wave, the frequency of the acoustic wave has been also significantly affected.

After the server allocates the frequency band of acoustic waves to the receiving terminal and the transmitting terminal, the transmitting terminal sends the acoustic wave signal of the preset frequency to the receiving terminal. The preset frequency is within the frequency band allocated by the server. The receiving terminal acquires the acoustic wave signal of the preset frequency sent by the transmitting terminal.

During actual applications, generally, many clients complete pairing at a same time. That is, many clients transmit acoustic waves at a same time. Therefore, to avoid interference among the acoustic wave signals, the server should allocate different frequency bands to each pair of paired clients within a small range. In this way, it may be ensured that an acoustic wave received by a client is sent by a paired client.

A reason for emphasizing the "small range" above is that: a frequency band of available acoustic waves is generally limited, and a large quantity of client pairs may send the acoustic waves at a same time. Accordingly, the server cannot allocate a different frequency band to each pair of the large quantity of client pairs. Therefore, the server may allocate different frequency bands to each pair of paired clients within the small range. Beyond the range, the server may simultaneously allocate the same frequency bands to other paired clients.

There are many methods for determining whether the two clients are within a range preset by the server. For example, location information of the two clients may be obtained by means of LBS positioning or GPS positioning. The server determines whether the clients are within the preset range according to the location information. When a distance between the two clients is relatively small, a situation described in the background may occur that measured location information of the two clients may be the same due to an error of positioning by means of the existing technologies. However, this does not affect determining whether the two clients are within the preset range by the server. When learning that the location information of the two clients obtained by means of the LBS positioning or the GPS positioning is the same, the server may consider by default that the two clients are relatively close to each other. That is, it considers that the two clients are within the preset range.

When a quantity of paired clients within a small range reaches an upper limit of the quantity of allocated frequency bands, there are not sufficient frequency bands. Accordingly, the server first allocates frequency bands to only paired clients "queuing" at the front. After a pair of clients completes the use of a frequency band, the server may allocate the frequency band to another pair of clients that are "queuing."

In addition, in a process in which the receiving terminal acquires the acoustic wave sent by the transmitting terminal, the receiving terminal can simultaneously acquire acoustic wave signals of multiple frequencies. However, the receiving terminal "pays attention to" only the acoustic wave in the frequency band allocated by the server. It has been mentioned above that the frequency of the acoustic wave signal changes in the transmission process, and the acoustic wave signal suffers interference from other acoustic wave signals. This may cause trouble to the receiving terminal receiving the signal sometimes, and whether the acquired acoustic wave is sent by a paired transmitting terminal is not determined.

This application provides two methods to resolve the problem, and the methods are as follows:

A first method: When the transmitting terminal sends the acoustic wave signal to the receiving terminal, the acoustic wave signal may include unique identifier information of the transmitting terminal. When the receiving terminal acquires a relatively large quantity of acoustic wave signals, the receiving terminal may recognize identification information of the acoustic wave signals to find the acoustic wave signal sent by the paired transmitting terminal.

A second method: The server may allocate two or more frequency bands to the two clients. The transmitting terminal may select an acoustic wave of a frequency respectively from the two or more frequency bands and superimpose the acoustic waves to obtain a new acoustic wave signal, and use the acoustic wave signal as the acoustic wave signal of the preset frequency. In this way, after the receiving terminal acquires the superimposed acoustic wave, conditions for verifying whether the acoustic wave is sent by the transmitting terminal are correspondingly increased. For example, if the acoustic wave acquired by the receiving terminal is the superimposed acoustic wave, it is to verify whether the acoustic wave satisfies both two preset frequencies. Apparently, compared with an acoustic wave of a frequency, the receiving terminal can more accurately determine whether an object sending the acoustic wave is the paired transmitting terminal after acquiring the superimposed acoustic wave.

Figure 5:
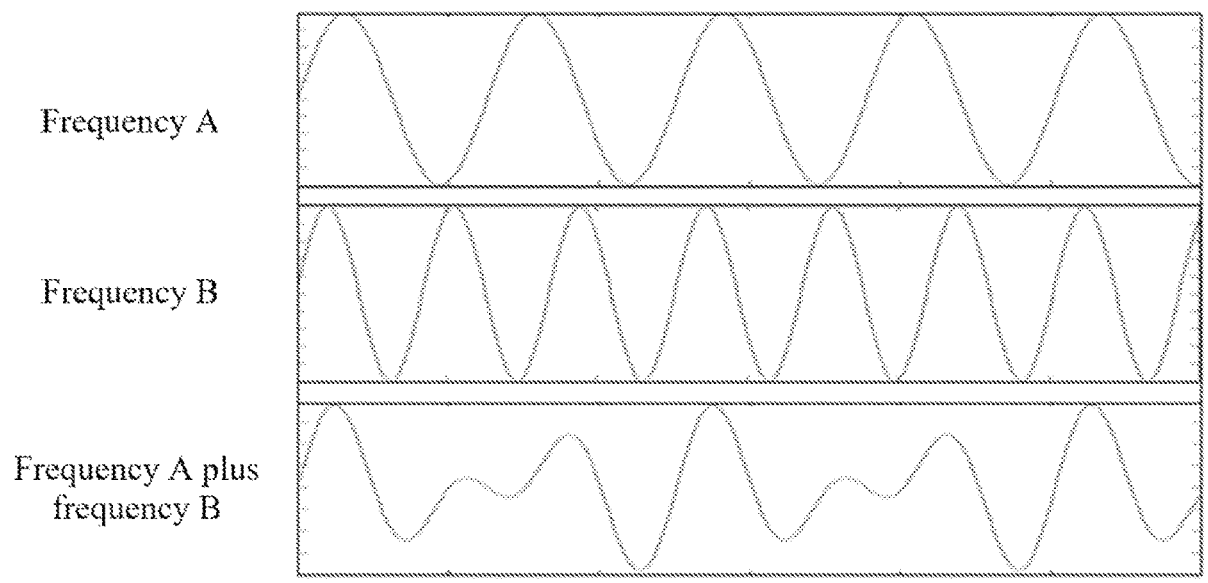
FIG. 5 is a schematic diagram of an acoustic wave sent by a transmitting terminal to a receiving terminal according to an embodiment of this application.

FIG. 5 shows a diagram of an acoustic wave. The transmitting terminal may send an acoustic wave of a frequency A to the receiving terminal, or send an acoustic wave of a frequency B to the receiving terminal, or send, to the receiving terminal, an acoustic wave that is obtained after an acoustic wave of a frequency A and an acoustic wave of a frequency B are superimposed.

With regard to a method for determining "the preset frequency" by the transmitting terminal, in addition to the method described above, that is, a fixed frequency is selected from the frequency band allocated by the server and is used as "the preset frequency," there are also many methods. For example, before the transmitting terminal sends the acoustic wave signal of the preset frequency to the receiving terminal, the receiving terminal and the transmitting terminal specify a frequency for transmission of the acoustic wave signal in advance, and use the frequency as "the preset frequency."

In some embodiments, the transmitting terminal "informs" the receiving terminal of a frequency of a to-be-sent acoustic wave signal. This may be that the transmitting terminal directly sends the frequency of the to-be-sent acoustic wave signal to the receiving terminal, or the transmitting terminal first sends the frequency of the to-be-sent acoustic wave signal to the server, and then the server sends the frequency to the receiving terminal, or the like.

In step 12, in addition to determining the change in the distance between the receiving terminal and the transmitting terminal according to a change in the received energy of the acoustic wave, the receiving terminal may further determine whether the transmitting terminal is near the receiving terminal according to the received energy of the acoustic wave. In some embodiments, a threshold of the energy of the acoustic wave may be determined first. There are many methods for determining the energy threshold. For example, the smallest value of energy of acoustic wave that may be received by the two clients within a preset range may be obtained through many tests, and the smallest value is used as the energy threshold. If energy of an acoustic wave acquired by the receiving terminal is less than the energy threshold, it is considered that a distance between the two clients is beyond the preset range. That is, the transmitting terminal is not near the receiving terminal. If energy of an acoustic wave acquired by the receiving terminal is greater than the energy threshold, it is considered that the transmitting terminal is near the receiving terminal.

In step 13, the receiving terminal may search for the transmitting terminal according to the prompt information, and the transmitting terminal may also search for the receiving terminal according to the prompt information.

There are also many manners in which the transmitting terminal searches for the receiving terminal according to the prompt information. The following describes four examples of implementations:

In a first implementation, after generating the prompt information, the receiving terminal directly sends the prompt information to the transmitting terminal, to prompt a user holding the transmitting terminal about the change in the distance between the transmitting terminal and the receiving terminal.

In a second implementation, after generating the prompt information, the receiving terminal first sends the prompt information to the server, and then the server sends the prompt information to the transmitting terminal.

Figure 6:
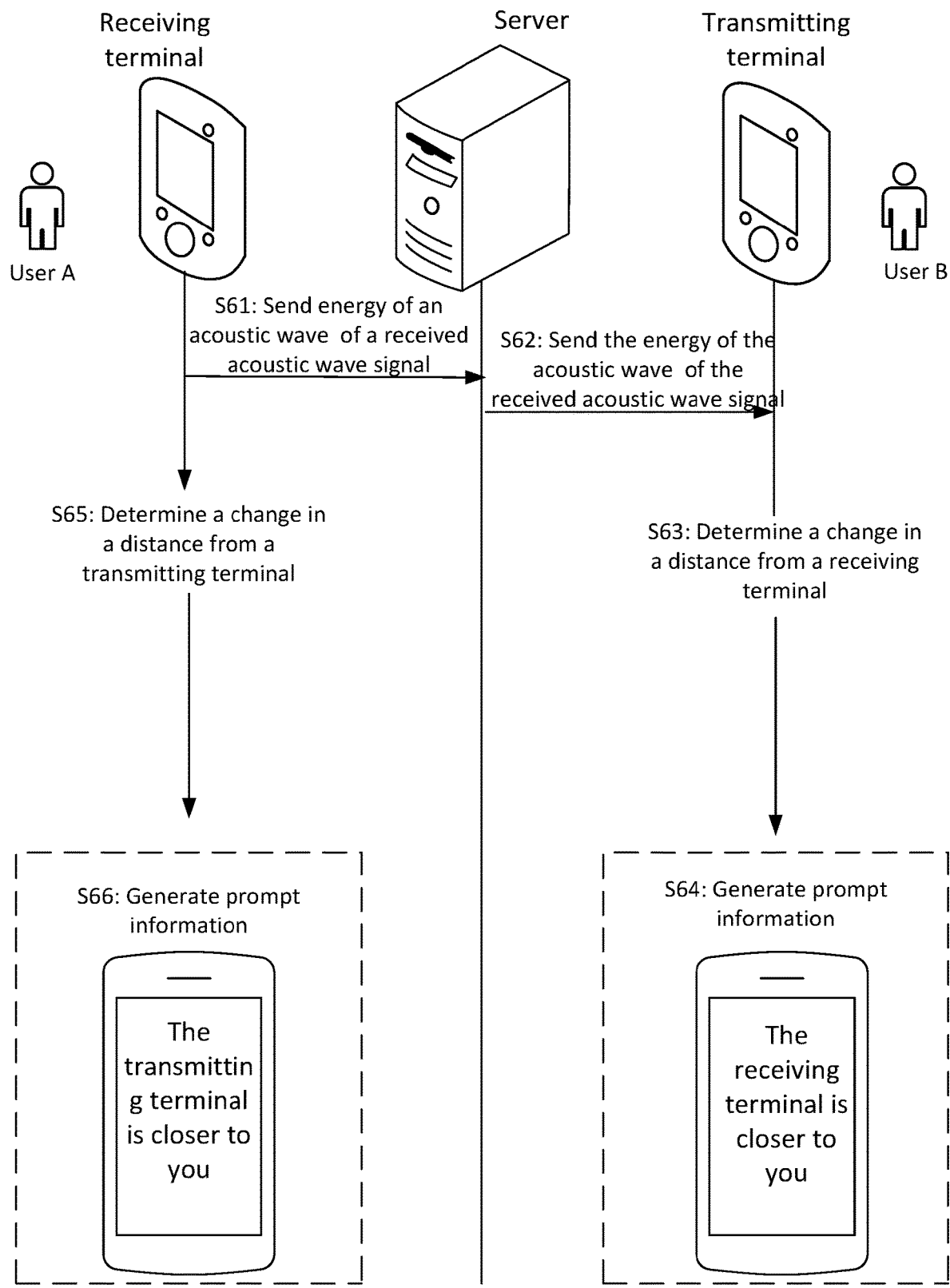
FIG. 6 is a schematic flowchart of a location prompting method according to an embodiment of this application.

In a third implementation, the transmitting terminal may also generate the prompt information according to the energy of the acoustic wave signal. A method may be: after the receiving terminal acquires the acoustic wave signal sent by the transmitting terminal, the transmitting terminal receives information of the acoustic wave signal returned by the receiving terminal. The information may be a frequency, a wave length, energy, an amplitude, or the like of the acoustic wave signal. "Energy" is still used as an example below, to describe a process in which the transmitting terminal generates the prompt information. A process is shown in FIG. 6.

Step 61: After acquiring the acoustic wave signal of the preset frequency sent by the transmitting terminal, the receiving terminal obtains energy of an acoustic wave corresponding to the acoustic wave signal by means of analysis, and the receiving terminal sends the energy of the acoustic wave corresponding to the acoustic wave signal to the server.

Step 62: The server sends the energy of the acoustic wave corresponding to the acoustic wave signal to the transmitting terminal.

Step 63: The transmitting terminal determines a change in a distance from the receiving terminal according to a change in the received energy of the acoustic wave signal.

A determining method is the same as or similar to the method for determining a distance from the transmitting terminal by the receiving terminal according to the change in the energy of the acoustic wave signal. Details are not described herein again.

Step 64: Generate prompt information according to the change in the distance. The prompt information is used to prompt the change in the distance between the user B and the user A. For example, the prompt information displays "the receiving terminal is closer to you." Therefore, the user B learns that a direction in which the user B searches for the user A is correct, and can continue following the direction to search for the user A.

It has been mentioned above that as shown in FIG. 6, the receiving terminal determines a change in a distance from the receiving terminal according to the change in energy of the received acoustic wave signal (step 65). Finally, the receiving terminal generates prompt information according to the change in the distance (step 66). The prompt information is used to prompt the change in the distance between the user A and the user B. For example, the prompt information displays "the transmitting terminal is closer to you." Therefore, the user A learns that a direction in which the user A searches for the user B is correct, and can continue following the direction to search for the user B.

In some embodiments, step 65 and step 61 are performed by the receiving terminal according to an actual sequence. For example, to enable the receiving terminal and the transmitting terminal to acquire the prompt information as synchronously as possible, the receiving terminal may perform step 61 before performing step 65, or may simultaneously perform step 61 and step 65, or the like.

In a fourth implementation, first, after acquiring the acoustic wave signal of the preset frequency sent by the transmitting terminal, the receiving terminal obtains energy of an acoustic wave corresponding to the acoustic wave signal by means of analysis, and directly sends the energy of the acoustic wave to the transmitting terminal. Next, the transmitting terminal determines the change in the distance between the receiving terminal and the transmitting terminal according to a change in the received energy of the acoustic wave. Finally, the transmitting terminal generates the prompt information according to the change in the distance, and searches for the receiving terminal according to the prompt information.

For the foregoing four manners in which the transmitting terminal searches for the receiving terminal according to the prompt information, in the first manner and the second manner, the transmitting terminal searches for the receiving terminal according to the prompt information generated by the receiving terminal. In the third manner and the fourth manner, the transmitting terminal finally generates the prompt information according to analysis performed on the energy of the acoustic wave sent by the receiving terminal, and searches for the receiving terminal according to the prompt information. As can be learned, in the first manner and the second manner, the transmitting terminal does not need to analyze the energy of the acoustic wave. Compared with the third manner and the fourth manner, resource consumption of the clients is reduced.

However, in the first manner and the second manner, the transmitting terminal obtains the prompt information after the receiving terminal generates the prompt information. In this way, a time at which the transmitting terminal obtains the prompt information is later than a time at which the receiving terminal obtains the prompt information. This may cause trouble to the two located users sometimes. In the third manner and the fourth manner, after obtaining the energy of the acoustic wave signal, the receiving terminal may first send the energy of the acoustic wave to the transmitting terminal. Then the receiving terminal and the transmitting terminal may synchronously analyze the energy of the acoustic wave signal, to enable the receiving terminal and the transmitting terminal to obtain the prompt information as simultaneously as possible. However, in the third manner and the fourth manner, the transmitting terminal analyzes the acoustic wave signal. Compared with the first manner and the second manner, the clients consume more resources.

In some embodiments, in a location prompting method provided in this application, in the two located clients, one client may be used as a transmitting terminal of an acoustic wave signal and the other client may be used as a receiving terminal of the acoustic wave signal. Alternatively, each of the two located clients is both a transmitting terminal of an acoustic wave signal and a receiving terminal of an acoustic wave signal.

In some embodiments, two clients each send an acoustic wave signal of a preset frequency to each other. Then the two clients respectively analyze energy of the received acoustic wave signal to determine a change in a distance between the two clients, and generate prompt information according to the change in the distance. A method for each client to obtain the prompt information according to the energy of the received acoustic wave signal is the same as the foregoing method. To avoid repetitions, a process is not described in detail herein.

At least one technical solution used in this embodiment of this application can achieve the following beneficial effects:

The method provided in this application mainly depends on sending and receiving of the acoustic wave signal between the transmitting terminal and the receiving terminal. The change in the distance between the transmitting terminal and the receiving terminal is determined according to the change in received acoustic wave signal. Compared with positioning methods in the existing technologies, according to the method for determining a change in a distance provided in this application, when the distance between locations of the transmitting terminal and the receiving terminal is relatively small, a change in a distance between the two terminals also can be determined. In this application, corresponding prompt information may further be generated according to the change in the distance between the two terminals. The prompt information is used to prompt a user about the change in the distance between the two terminals, and guide the user to move in a direction in which a distance between the two terminals is reduced. Compared with the existing positioning technologies, when a distance between two located users is relatively small, a chance of the users finding each other is increased by using the method provided in this application.

Moreover, when two users who have never met intend to meet each other, the two users can be guided to a relatively small range by using an existing positioning technology. However, the two users have never meet and do not know facial features of each other, thus, even if the two users are within a relatively small range, it may be still quite difficult for the two users to find each other sometimes. By applying embodiments of this application, when the two unfamiliar users are close to each other, energy of the acoustic wave transmitted by two corresponding clients is quite high. Accordingly, the users easily lock an object to be met according to prompt information generated by the clients, thereby improving user experience.

Figure 7:
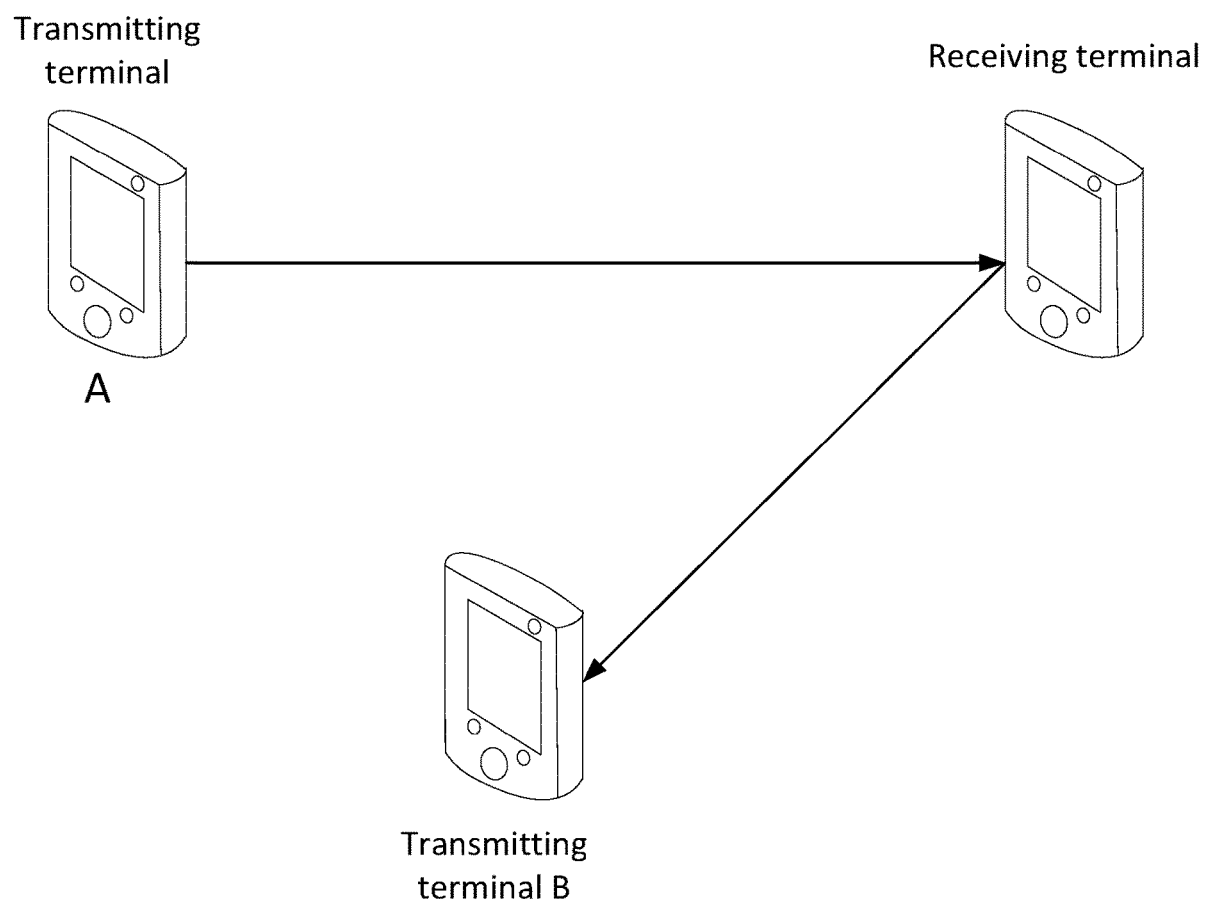
FIG. 7 is a schematic diagram of a positioning method provided in the existing technologies.

In addition, besides the LBS positioning and the GPS positioning, the existing positioning technologies further include an ultrasonic positioning method. The positioning method is shown in FIG. 7: When the transmitting terminal is located at a position A, the transmitting terminal sends an ultrasonic signal to the receiving terminal. When the ultrasonic signal is transmitted to the receiving terminal, reflection of the signal occurs, and the signal is reflected to the transmitting terminal. It is assumed that the transmitting terminal is located at a position B in this case. According to a transmission speed of the ultrasonic signal and a time used by the transmitting terminal to receive the ultrasonic signal, a distance between the receiving terminal and the transmitting terminal is calculated.

It may be learned from the foregoing existing ultrasonic positioning method that the location prompting method provided in this application is that a client emits an acoustic wave signal and the other client receives the acoustic wave signal, but the foregoing existing ultrasonic positioning method is that the same client emits and receives an ultrasonic signal. As can be learned, a user may obtain location information of a target more rapidly by using the method provided in this application. For the existing ultrasonic positioning method, an ultrasonic wave needs to be emitted, and location information of a target cannot be obtained until analysis is performed after the ultrasonic wave is reflected to the transmitting terminal. However, in the method provided in this application, the acoustic wave signal is emitted, and analysis can be performed immediately when the receiving terminal acquires information of the acoustic wave, to obtain the location information of the target. Therefore, the location prompting method provided this application can help a user to find the target more effectively.

During actual applications, the method provided in this application may be used in combination with an existing LBS positioning technology. When a distance between two terminals is relatively large, a change in a distance between the two terminals is reflected by means of LBS positioning. When a distance between the two terminals is within a preset range, a change in a distance between the two terminals is reflected by means of acoustic positioning. When network environment is poor, the user also can find the target more effectively.

Embodiment 2

Figure 8:
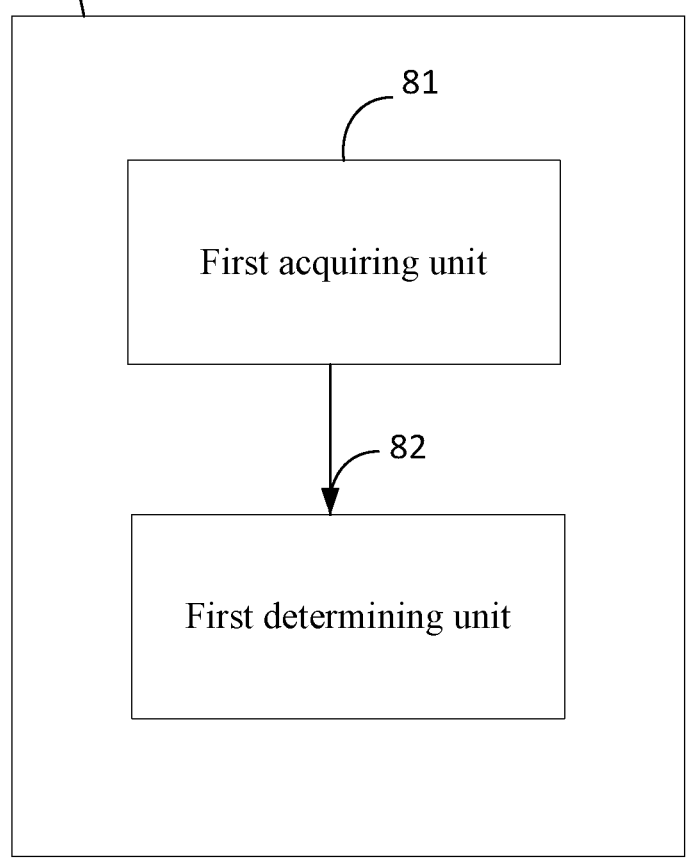
FIG. 8 is a schematic structural diagram of an apparatus for determining a change in a distance according to an embodiment of this application.

Embodiment 1 provides a method for determining a change in a distance. Correspondingly, this application further provides an apparatus for determining a change in a distance, also to resolve a problem that when a distance between two located users is relatively small, a change in a distance between the two users cannot be determined by using existing positioning technologies. The apparatus is located in a receiving terminal. A structure is shown in FIG. 8, and the apparatus includes the following units:

a first acquiring unit 81 and a first determining unit 82, where the first acquiring unit 81 is configured to acquire an acoustic wave signal of a preset frequency sent by a transmitting terminal; and the first determining unit 82 is configured to determine a change in a distance between the transmitting terminal and the receiving terminal according to the acquired acoustic wave signal.

A working process of the apparatus is: first, the first acquiring unit 81 acquires the acoustic wave signal of the preset frequency sent by the transmitting terminal. Next, the first determining unit 82 determines the change in the distance between the transmitting terminal and the receiving terminal according to the acquired acoustic wave signal.

Figure 9:
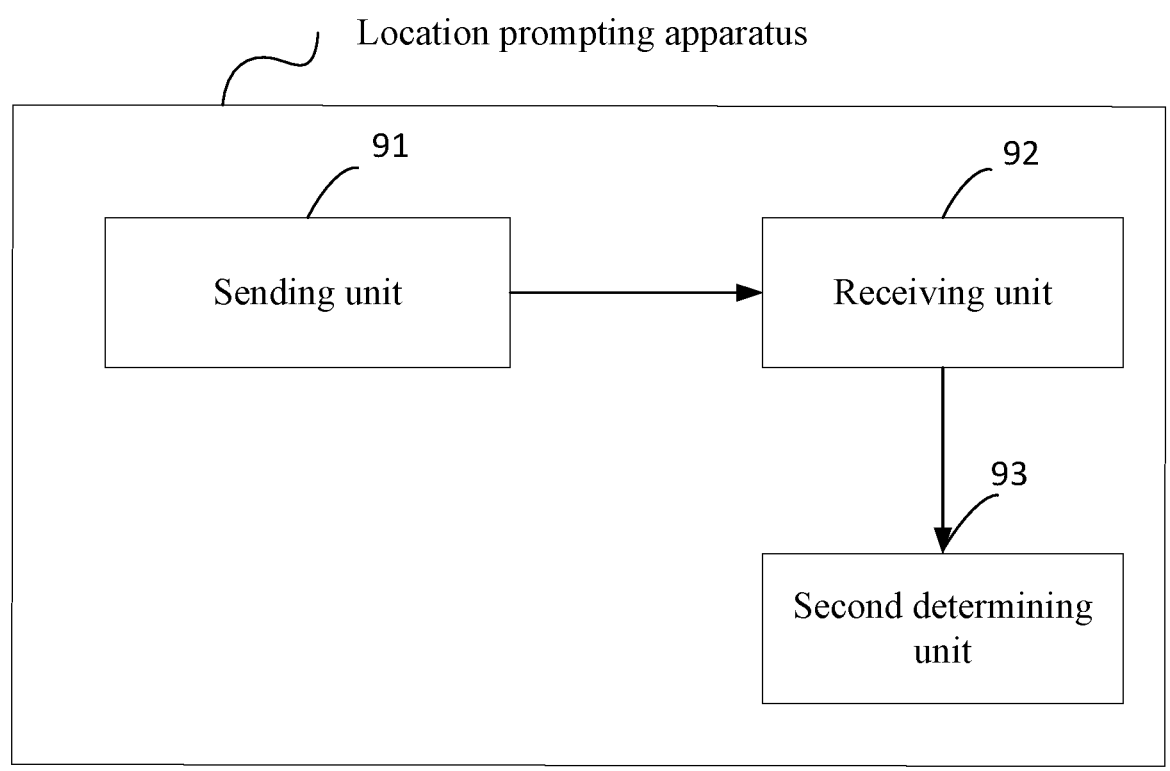
FIG. 9 is a schematic structural diagram of an apparatus for determining a change in a distance according to an embodiment of this application.

This application further provides a method for determining a change in a distance, also to resolve a problem that when a distance between two located users is relatively small, a change in a distance between the two users cannot be determined by using existing positioning technologies. The apparatus is located in a transmitting terminal. A structure is shown in FIG. 9, and the apparatus includes the following units:

a sending unit 91, a receiving unit 92, and a second determining unit 93, where the sending unit 91 is configured to send an acoustic wave signal of a preset frequency to a receiving terminal;

the receiving unit 92 is configured to receive information of the acoustic wave signal returned by the receiving terminal after acquiring the acoustic wave signal; and the second determining unit 93 is configured to determine a change in a distance between the receiving terminal and the transmitting terminal according to the information of the acoustic wave signal.

A working process of the apparatus is: first, the sending unit 91 sends the acoustic wave signal of the preset frequency to the receiving terminal. Next, after the receiving terminal acquires the acoustic wave signal, the receiving unit 92 receives the information of the acoustic wave signal returned by the receiving terminal. Finally, the second determining unit 93 determines the change in the distance between the receiving terminal and the transmitting terminal according to the information of the acoustic wave signal.

Figure 10:
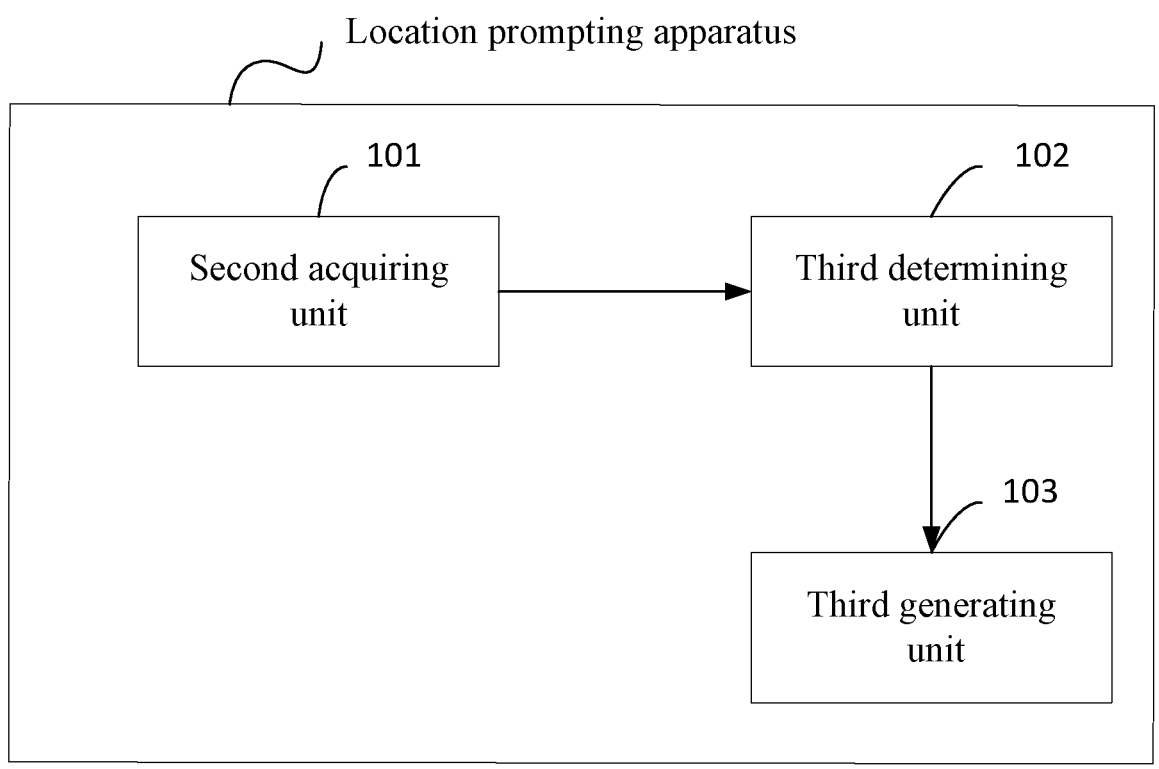
FIG. 10 is a schematic structural diagram of a location prompting apparatus according to an embodiment of this application.

Correspondingly, this embodiment of this application further provides a location prompting apparatus, to resolve a problem that when a distance between two located users is relatively small, the two users cannot find each other by using existing positioning technologies. The apparatus is located in a receiving terminal. A structure is shown in FIG. 10, and the apparatus includes the following units:

a second acquiring unit 101, a third determining unit 102, and a third generating unit 103, where the second acquiring unit 101 is configured to acquire an acoustic wave signal of a preset frequency sent by a transmitting terminal;

the third determining unit 102 is configured to determine a change in a distance between the transmitting terminal and the receiving terminal according to the acquired acoustic wave signal; and the third generating unit 103 is configured to generate prompt information according to the change in the distance, where the prompt information is used to prompt the change in the distance between the receiving terminal and the transmitting terminal.

A working process of the apparatus is: first, the second acquiring unit 101 acquires the acoustic wave signal of the preset frequency sent by the transmitting terminal. Next, the third determining unit 102 determines the change in the distance between the transmitting terminal and the receiving terminal according to the acquired acoustic wave signal. Finally, the third generating unit 103 generates the prompt information according to the change in the distance. The prompt information is used to prompt the change in the distance between the receiving terminal and the transmitting terminal.

Beneficial effects obtained by applying the apparatus embodiment provided in this application are the same as or similar to the beneficial effects obtained by applying the foregoing method embodiment. To avoid repetitions, details are not described herein again.

Embodiment 3

Figure 11:
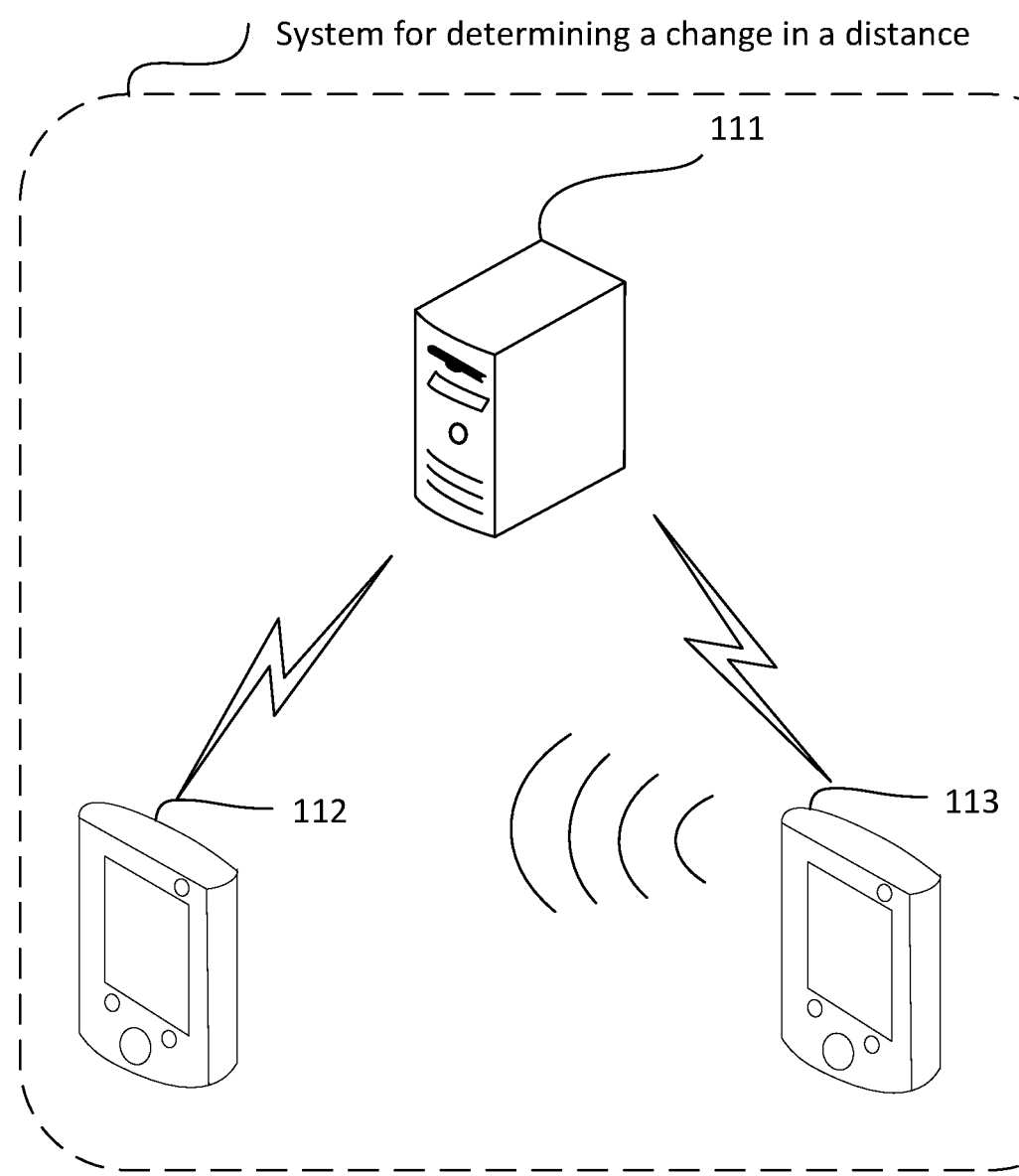
FIG. 11 is a schematic structural diagram of a system for determining a change in a distance according to an embodiment of this application.

Correspondingly, this application further provides a system for determining a change in a distance, also to resolve a problem that when a distance between two located users is relatively small, a change in a distance between the two users cannot be determined by using existing positioning technologies. A schematic structural diagram of the system is shown in FIG. 11, and the system includes:

a server 111, a receiving terminal 112, and a transmitting terminal 113, where:

the server 111 is configured to: after a pairing relationship is established between the receiving terminal and the transmitting terminal, allocate a frequency band of acoustic waves to the receiving terminal and the transmitting terminal; after the receiving terminal acquires an acoustic wave signal of a preset frequency sent by the transmitting terminal, receive information of the acoustic wave signal of the preset frequency sent by the receiving terminal, where the preset frequency is within the frequency band; and send the information of the acoustic wave signal to the transmitting terminal;

the receiving terminal 112 is configured to: acquire the acoustic wave signal of the preset frequency sent by the transmitting terminal; and determine a change in a distance between the transmitting terminal and the receiving terminal according to the acquired acoustic wave signal; and the transmitting terminal 113 is configured to: send the acoustic wave signal of the preset frequency to the receiving terminal; after the receiving terminal sends the information of the acquired acoustic wave signal to the server, receive the information of the acoustic wave signal sent by the server; and determine the change in the distance between the receiving terminal and the transmitting terminal according to the information of the acoustic wave signal.

A working process of the system embodiment is: in a first step, after the pairing relationship is established between the receiving terminal and the transmitting terminal, the server 111 allocates a frequency band of acoustic waves to the receiving terminal 112 and the transmitting terminal 113. In a second step, the transmitting terminal 113 sends the acoustic wave signal of the preset frequency to the receiving terminal 112. In a third step, the receiving terminal 112 acquires the acoustic wave signal of the preset frequency sent by the transmitting terminal 113, and determines the change in the distance between the transmitting terminal 113 and the receiving terminal 112 according to the acquired acoustic wave signal.

In addition, the receiving terminal 112 further sends the information of the received acoustic wave signal to the server 111. The server 111 sends the information of the acoustic wave signal to the transmitting terminal 113. The transmitting terminal 113 receives information of the acoustic wave signal sent by the server 111, and determines the change in the distance between the receiving terminal 112 and the transmitting terminal 113 according to the information of the acoustic wave signal.

Beneficial effects obtained by applying the system embodiment provided in this application are the same as or similar to the beneficial effects obtained by applying the foregoing method embodiment. To avoid repetitions, details are not described herein again.

A person skilled in the art should understand that the embodiments of this application may be provided as methods, systems, or computer program products. Therefore, this application may take the form of complete hardware embodiments, complete software embodiments, or embodiments combining software and hardware. In addition, this application may use a form of a computer program product implemented on one or more computer available storage media including computer available program code (including but not limited to a magnetic disk storage, a CD-ROM, an optical memory, and the like).

This application is described with reference to flowcharts and/or block diagrams of the method, the device (the system), and the computer program product in the embodiments of this application. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may further be stored in a computer readable memory that can guide the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory may include forms such as a volatile memory in a computer-readable medium, a random access memory (RAM), and/or a non-volatile memory, for example, a read-only memory (ROM) or a flash memory (flash RAM). The memory is an example of the computer-readable medium.

The computer-readable medium includes non-volatile, volatile, removable, and non-removable media that can store information by using any method or technology. The information may be a computer-readable instruction, a data structure, a program module, or other data.

Examples of a storage medium of a computer includes, but are not limited to, a phase-change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette tape, a magnetic disk storage or another magnetic storage device or another non-transmission medium, which can be used to store information accessed by the computer device. According to definitions in this specification, the computer-readable medium does not include a transitory media, for example, a modulated data signal and carrier.

It should be further noted that the terms "include," "comprise," or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

The foregoing descriptions are merely embodiments of this application, and are not intended to limit this application. For a person skilled in the art, this application may have various modifications and alterations. Any alteration, equivalent change or modification made within the spirit and principle of this application shall fall within the scope of the claims of this application.

What is claimed is:

1. A method for determining a change in a distance, comprising:
    receiving, by a second device, a pairing request from a server, wherein the pairing request is forwarded by the server from a first device;
    sending, by the second device to the server, a pairing result indicating that the second device has accepted the pairing request and the second device is successfully paired with the first device;
    sending, by the second device to the first device, a plurality of acoustic wave signals, wherein the acoustic wave signals are sent periodically;
    obtaining, by the second device from the first device, information of the plurality of acoustic wave signals as received by the first device;
    determining, by the second device, one or more differences between magnitudes of energy of two consecutive acoustic wave signals among the plurality of acoustic wave signals according to the obtained information; and
    determining, by the second device, a change in a distance between the second device and the first device according to the one or more differences between the magnitudes of energy.

2. The method according to claim 1, wherein the acoustic wave signals are selected by the second device from acoustic waves corresponding to an allocated frequency band.

3. The method according to claim 2, wherein the frequency band is allocated by the server based on the server determining that the distance between the first device and the second device is within a preset distance range.

4. The method according to claim 2, wherein one or more other frequency bands are allocated to the first device and the second device by the server, and wherein each of the acoustic wave signals from the second device are superimposed with one or more other acoustic wave signals of one or more frequencies respectively within the one or more other frequency bands.

5. The method according to claim 1, wherein the obtaining the information of the plurality of acoustic wave signals as received by the first device comprises:
    obtaining, by the second device from the first device, information on energy of the plurality of acoustic wave signals.

6. The method according to claim 1, wherein after the determining the change in the distance between the second device and the first device, the method further comprises:
    generating, by the second device, prompt information corresponding to the change in the distance between the second device and the first device.

7. The method according to claim 6, wherein after the generating the prompt information corresponding to the change in the distance between the second device and the first device, the method further comprises:
    searching, by the second device, for the first device according to the prompt information.

8. The method according to claim 6, further comprising presenting the prompt information with a sound, a picture, an animation, or a vibration.

9. The method according to claim 8, wherein when the prompt information is presented with a sound, before the generating the prompt information, the method further comprises:
    establishing a correspondence between the magnitude of energy of an acoustic wave signal and a volume of the sound of the prompt information.

10. A system for determining a change in a distance, comprising one or more processors and one or more non-transitory computer-readable memories coupled to the one or more processors and configured with instructions executable by the one or more processors to cause the system to perform operations comprising:
    receiving a pairing request from a server, wherein the pairing request is forwarded by the server from a first device;
    sending a pairing result indicating that a second device has accepted the pairing request and the second device is successfully paired with the first device;
    sending a plurality of acoustic wave signals, wherein the acoustic wave signals are sent periodically;
    obtaining information of the plurality of acoustic wave signals as received by the first device;
    determining one or more differences between magnitudes of energy of two consecutive acoustic wave signals among the plurality of acoustic wave signals according to the obtained information; and determining a change in a distance between the second device and the first device according to the one or more differences between the magnitudes of energy.

11. The system of claim 10, wherein the acoustic wave signals are selected by the second device from acoustic waves corresponding to an allocated frequency band.

12. The system of claim 11, wherein the frequency band is allocated by the server based on the server determining that the distance between the first device and the second device is within a preset distance range.

13. The system of claim 11, wherein one or more other frequency bands are allocated to the first device and the second device by the server, and wherein each of the acoustic wave signals from the second device are superimposed with one or more other acoustic wave signals of one or more frequencies respectively within the one or more other frequency bands.

14. The system of claim 10, wherein the obtaining the information of the plurality of acoustic wave signals as received by the first device comprises:
  obtaining information on energy of the plurality of acoustic wave signals.

15. The system of claim 10, wherein the operations further comprise, after the determining the change in the distance between the second device and the first device:
  generating prompt information corresponding to the change in the distance between the second device and the first device.

16. The system of claim 15, wherein the operations further comprise, after the generating the prompt information corresponding to the change in the distance between the second device and the first device:
  searching for the first device according to the prompt information.

17. The system of claim 15, wherein the operations further comprise presenting the prompt information with a sound, a picture, an animation, or a vibration.

18. The system of claim 17, wherein the operations further comprise, when the prompt information is presented with a sound, before the generating the prompt information:
  establishing a correspondence between the magnitude of energy of an acoustic wave signal and a volume of the sound of the prompt information.

19. A non-transitory computer-readable storage medium for determining a change in a distance, configured with instructions executable by one or more processors to cause the one or more processors to perform operations comprising:
  receiving a pairing request from a server, wherein the pairing request is forwarded by the server from a first device;
  sending a pairing result indicating that a second device has accepted the pairing request and the second device is successfully paired with the first device;
  sending a plurality of acoustic wave signals, wherein the acoustic wave signals are sent periodically;
  obtaining information of the plurality of acoustic wave signals as received by the first device;
  determining one or more differences between magnitudes of energy of two consecutive acoustic wave signals among the plurality of acoustic wave signals according to the obtained information; and
  determining a change in a distance between the second device and the first device according to the one or more differences between the magnitudes of energy.

20. The medium of claim 19, wherein the operations further comprise, after the determining the change in the distance between the second device and the first device:
  generating prompt information corresponding to the change in the distance between the second device and the first device.

* * * * *